United States Patent [19]
Reed

[11] 3,807,539
[45] Apr. 30, 1974

[54] TORQUE LIMITING DEVICES

[76] Inventor: James Ronald Reed, Braid House, 2, Colwyn Bay, Wales

[22] Filed: Aug. 11, 1972

[21] Appl. No.: 279,750

[30] Foreign Application Priority Data
Aug. 12, 1971  Great Britain.................... 37856/71

[52] U.S. Cl.................... 192/150, 192/56 F, 91/59
[51] Int. Cl........................................... F16d 43/20
[58] Field of Search................ 192/.034, 56 F, 150; 91/59; 173/12; 73/136 D; 81/52.4 R

[56] References Cited
UNITED STATES PATENTS

| | | | |
|---|---|---|---|
| 3,013,600 | 12/1961 | Baker et al. | 192/.034 X |
| 3,108,471 | 10/1963 | Buchele et al. | 73/136 D |
| 2,831,084 | 4/1958 | Swinarski | 60/54.5 R |
| 3,183,672 | 5/1965 | Morgan | 60/54.5 R |
| 3,298,488 | 1/1967 | McDonald | 192/56 F |
| 3,664,474 | 5/1972 | Blake | 192/56 F |

*Primary Examiner*—Allan D. Herrmann
*Attorney, Agent, or Firm*—Diller, Brown, Ramik & Wight

[57] ABSTRACT

The present invention relates to a torque limiting device employing a torque clutch through which torque is transmitted from a motor to an output shaft capable of carrying a tool. The clutch members are arranged to create a hydraulic pressure proportional to torque transmitted to the output shaft means sensitive to the increase in hydraulic pressure and upon said hydraulic pressure exceeding a predetermined valve, arranged to interrupt or disconnect the motor drive to the clutch.

11 Claims, 4 Drawing Figures

TORQUE LIMITING DEVICES

This invention relates to a torque limiting device and, more particularly, to a motor driven torque limiting nut runner.

Many conventional motor driven torque limiting nut runner units incorporate therein two co-operating toothed clutch members held in contact by a compression spring, the torque requirement of the unit being varied as desired by adjusting the pressure of the spring. As the desired torque level is reached, the clutch members, because of the form of the clutch teeth, ride apart against the spring pressure. When the clutch members are completely disengaged torque transmission ceases and the unit is said to have "bounced" its clutch. If several such units are mounted in a multihead device, such as is widely used in the motor industry for example for tightening cylinder head nuts, the unit which first reaches its torque level will bounce its clutch and will continue to do so until the last nut reaches its torque rating. This can result in excessive wear on the clutch members, unnecessary noise and also imparts to the nuts a torque rating in excess of that which is desired due to the impacting effect of the bouncing clutch members.

It is an object of the present invention to provide a torque limiting device wherein the disadvantages referred to above may be reduced or eliminated.

According to the present invention a torque limiting device includes a clutch the clutch members are arranged to create a hydraulically pressure proportional to the face urging the clutch members apart, and said hydraulic pressure is continuously monitored and adapted, on exceeding a predetermined level, to interrupt or disconnect the motor drive to the clutch.

In a preferred embodiment, the present invention provides a torque limiting device comprising a tool receiving member adapted to be driven by a co-operating motor through a clutch having members which are adapted to move relative to each other in response to changes in torque transmission, relative movement between said clutch members acting to affect the pressure in a hydraulic line which pressure, upon attaining a predetermined value is adapted to actuate switch means in a power line serving the motor to cut off the power supply to said motor.

Alternatively, the change in hydraulic pressure may be monitored mechanically for example by monitoring the contraction or expansion of a bellows which constitutes a wall of a fluid reservoir which is included in the hydraulic line.

In its main proposed use as a torque limiting nut runner the device is usually adjusted so that the power to the motor is interrupted when the nut is tightened to a predetermined extent and this usually occurs before the clutch members become totally disengaged. In this way, total disconnection of the clutch member may be avoided and many of the disadvantages of prior art devices, such as clutch bounce, are avoided.

The clutch may conveniently of a kind employing two toothed clutch members which are held in contact by hydraulic pressure, and the teeth having such a form that, as the torque increases is reached, the clutch members are forced apart against the hydraulic retaining pressure. In such an arrangement, changes in the back pressure generated in the hydraulic line providing the clutch pressure may be utilized to actuate the switch means to the motor.

The present invention will be further described by way of example with reference to the accompanying drawings in which.

Figure 1:
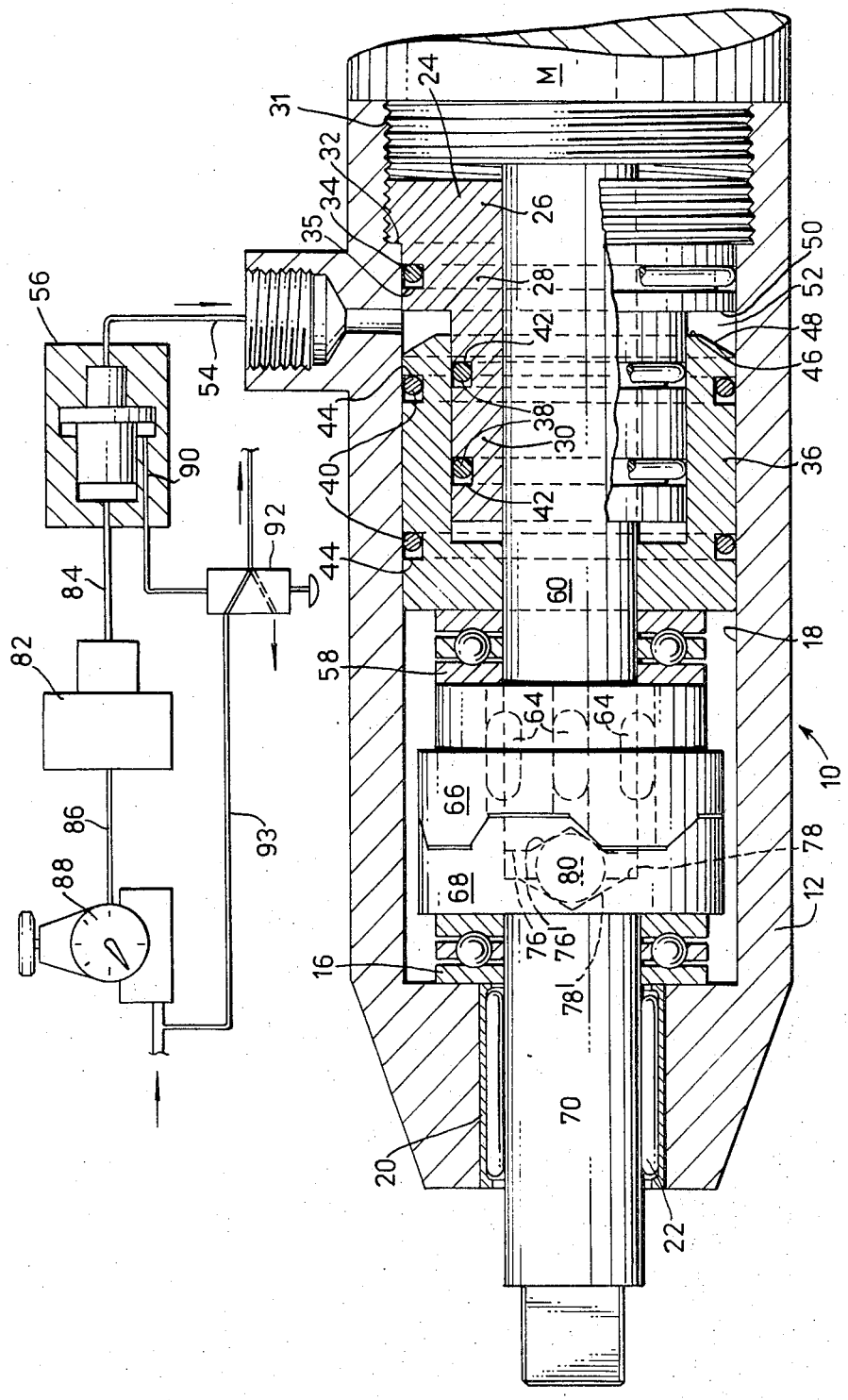
FIG. 1 shows a partially diagrammatic and partially axial section of a torque limiting nut runner in embodying the invention.

In FIG. 1 a torque limiter, generally designated 10, comprises a cylindrical housing 12 provided with an internal shoulder 14 against which a thrust bearing 16 abuts. The housing 12 has a first bore 18 and a second, reduced diameter bore 20 in which a needle bearing 22 is located.

The end of the larger diameter bore 18 remote from said second bore 20 is closed by an end stop 24 which comprises a peripherally threaded flange portion 26; a portion 28 which has a diameter reduced relative to portion 26, and an axial boss portion 30 extending into the bore 18. Portion 26 screws into threaded bore 31 and abuts shoulder 32 in the housing 12.

An O ring seal 34, located in recess 35 in portion 28 provides a hydraulic fluid seal the outer surface of portion 28 and the interior of bore 18. Slidably mounted on portion 30 of end stop 24 is a piston 36 which is slidable within the bore 18.

O ring seals 38 and 40 are located in recesses 42 and 44 respectively and these ensure that good hydraulic seals exist between portion 30 and the piston 36 and the piston and the piston wall and the wall of bore 18 respectively.

The radially outermost portion 48 of one face 46 of piston 36 is bevelled and this co-operates with a face 50 of end stop 24 to ensure that, even when piston 36 is in its limiting position abutting face 50 an annular fluid reservoir 52 is always present. A passageway 54 connects the reservoir 52 to an intensifier unit 56.

A drive shaft 60 extends from an air motor M, through end stop 24, piston 36 and thrust bearing 58 and terminates within a torque clutch assembly 62. Drive shaft 60 is slidingly keyed or splined to a clutch member 66 by way of keys 64 (shown in phantom) which are fixed in recesses in shaft 60, Clutch 62 comprises the member 66 slidable on shaft 60 and a member 68 which is integral with a drive output shaft 70. It is to be especially noted that the opposing faces of clutch members 66 and 68 are provided with co-operating teeth having inclined sides as shown. The drive output shaft 70 extends from clutch member 68 through thrust bearing 16 and needle bearing 22 and terminates outwardly of housing 12, in portion 74 which is adapted to receive a tool such as a socket for a nut head or screw driven blade.

The extremity 76 (shown in phantom) of drive shaft 60 and the face 78 (shown in phantom) of clutch member 68 are each provided with a depression 76' and 78' respectively wherein a ball bearing 80 (also shown in phantom) is retained) on the axis of the tool.

The intensifying unit 56 is connected to a further intensifying unit 82 by a hydraulic duct 84 to complete one hydraulic line. Intensifier 82 is connected, via an air line main 86, to an adjustable pressure regulator 88 and together with the intensifying unit 56 form pressure means for fluidically applying a predetermined force on the clutch assembly. A further hydraulic line 90 extends from intensifier 56 to a pressure switch 92 connected in a compressed air line 93, which provides power for the air motor M. Switch 92 which is a controller for the motor includes a reset switch for the reconnection of the air supply to the motor when desired.

The intensifying unit 56, together with the piston 36, forms a fluidic control device which is operative on the clutch assembly to maintain the interconnection between the motor and the clutch assembly. The fluidic control device includes a closed fluidic system which is defined by the intensifying unit 56, passageway 54, piston 36 and the reservoir 52. The piston 36 functions as a fluid displacing means operable by the clutch. The closed fluidic system includes a pressure member having a first piston portion (piston 36), a second piston portion (the piston of the intensifying unit 56), and a third piston portion (part of the switch or controller 92), with the intensifying unit forming means for applying fluid pressure on the pressure member. Pressure regulator 88 forms means for selectively varying the fluid pressure applied to the pressure member.

The device is illustrated in the drawing in its operational torque transmitting condition and operates as follows.

Clutch members 66 and 68, under the influence of hydraulic fluid pressure in reservoir 52 are forced together with their teeth interengaged and drive is therefore transmitted from motor M via clutch 62 to e.g. a nut or screw engaged by a tool, (not shown) on the end of drive output shaft 70. As the nut or screw tightens, the torque transmitted across the clutch members 66, 68 increases, clutch member 66 tends to separate from clutch member 68 because of the inclined driving faces of the clutch teeth and member 66 acts against piston 36 which, in turn, produces a back pressure in hydraulic line 54. This back pressure is transmitted via intensifier 56 and hydraulic line 90 to pressure switch 92. As the predetermined torque level is attained the back pressure produced in hydraulic line 90 becomes sufficient to trip switch 92 and cut off power to the motor M. It should be noted that the hydraulic back pressure produced by the relative movement of clutch members 66 and 68 is arranged to stop the motor before the said clutch members have become fully disengaged and therefore, the previously mentioned disadvantages of the prior art systems, such as clutch bounce and excessive wear are eliminated.

It should also be noted that the teeth of the torque clutch members 66 and 68 have inclined faces on both sides and the clutch can disengage at a predetermined torque irrespective of the direction of rotation imparted by the motor.

Although the embodiment shown in the drawings has the hydraulic lines and associated intensifier units arranged externally of the housing, these may alternatively be incorporated within the housing to provide a neat, compact unit.

The motor may be an air motor as described above, but this may be replaced by, for example, an electric motor, the switch 92 then being an electric switch included in the electric supply line to the motor.

Figure 2:
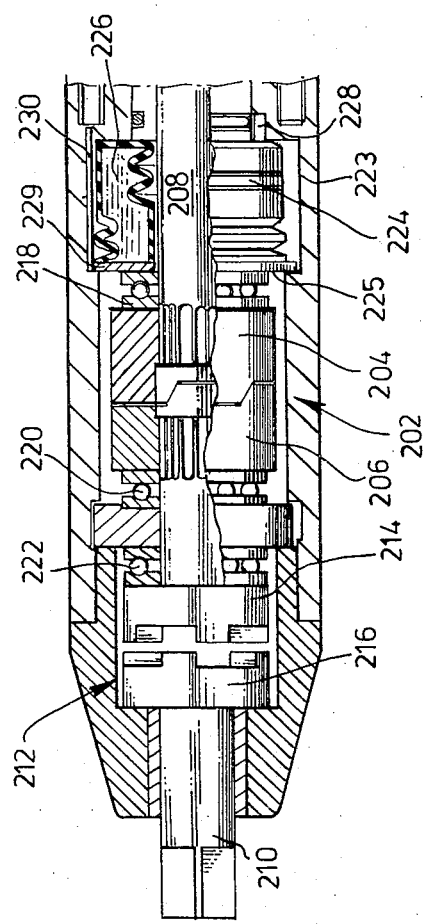
FIG. 2 is a part axial section of a further torque limiting nut runner embodying the present invention.

FIG. 2 is a part axial section of a second embodiment for a torque limiting device again represented as a nut runner. This device is generally similar to the device of FIG. 1 and again utilises a torque clutch 202 similar to clutch 62 and comprising two clutch members 206 and 204 which are axially displaceable relative to each other member 206 being slidably arranged on a drive shaft 208 and arranged to be driven by a motor (not shown). Drive transmitted by torque clutch 202 drives an output shaft 210 via an intermediate dog-clutch arrangement 212 comprising two clutch members 214 and 216 shown in the drawing in a disengaged (i.e. non-driving) condition. Associated with the various clutch members are thrust bearings 218, 220 and 222. Output shaft 210 is adapted to carry a tool such as a socket or screw-driver blade.

However, the piston 36 of the device of FIG. 1 is replaced by a bellows 224 located within the housing 223 and behind movable clutch member 204, the said bellows being filled with a hydraulic fluid 226 which is maintained under pressure by connection to a hydraulic fluid pressure source (not shown) via a duct 228.

Attached to a movable wall portion 229 of bellows 226 is a connecting shaft or rod 230 which is arranged so as to be slidable in an axial direction within the housing 223 and which is connected to a switch taking the form of a trip valve (not shown). In the arrangement shown a predetermined contraction of the bellows 224 results in a predetermined stroke of shaft 230 which is arranged to be sufficient to trip the said trip valve. The said trip valve is arranged to be an element in a line supplying power to a motor (not shown) which powers the device.

The nut runner device of FIG. 2 has the same general mode of operation as the nut runner illustrated in FIG. 1.

The clutch members 204 and 206 are normally maintained in engagement by the low hydraulic pressure within the bellows 224. As the torque applied to output shaft 210 increases the torque until member 204 is moved axially away from clutch member 206 due to the forces generated by the inclined faces of the two torque clutch members 204 and 206.

As the clutch members 204 and 206 are forced apart, clutch member 204 acts against bellows wall 225; via thrust bearing 218, forcing bellows 224 to contract gradually and the pressure of the hydraulic fluid 226 therewithin increases. Shaft 230 is thereby axially displaced to the left as the clutch member 204 is displaced until, at the predetermined torque level, shaft 230 trips the trip valve. The hydraulic pressure within bellows 224 must be choosen so that at the desired applied torque, the force (generated by the inclined faces of torque clutch members 204 and 206) has displaced said clutch members 204 and 206 apart sufficient to overcome the pressure within the bellows to the extent that the bellows contracts sufficiently for shaft 230 to actuate the switch as above described. The trip switch, when actuated by shaft 230 cuts the power supply to the motor and thus preventing any further, and undesired, tightening of the nut. It is to be noted that, generally, power to the motor, and therefore further tightening of the nut, is arrested before torque clutch members 206 and 204 become fully disengaged and thereby clutch bounce is eliminated.

Since the hydraulic pressure in bellows 224 is the only force acting to retain the torque clutch members 204 and 206 in engagement and adjustment of the pressure in bellows 224 provides a simple and rapid control of the torque applied to a nut by the nut runner device.

Figure 3:
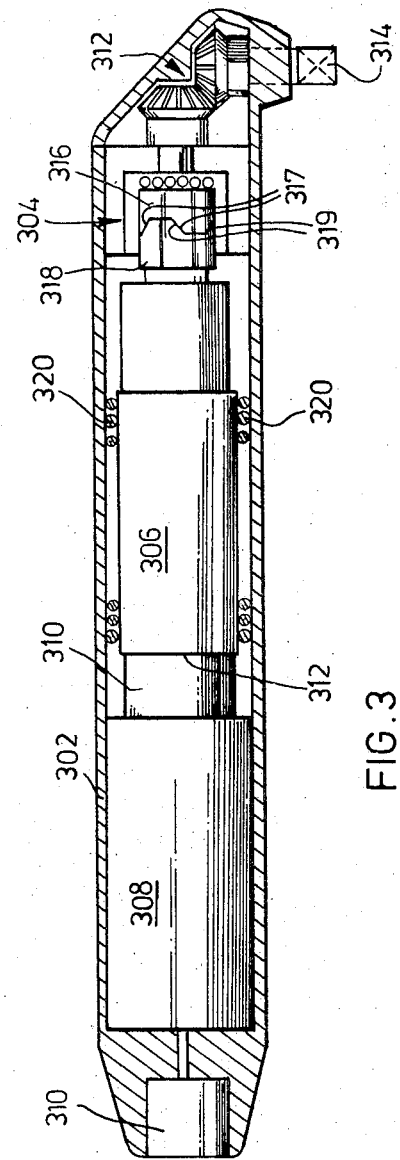
FIG. 3 is a diagrammatic axial section of yet a further torque limiting nut runner embodying the present invention.

In FIG. 3 of the drawings, there is illustrated in diagrammatic form a further torque limiting device of the present invention, again represented as a nut runner device. The nut runner device generally designated 300 comprises a housing 302, of square or rectangular cross-sectional configuration and the static part of the motor has a corresponding section for retention by the housing located within housing 302 are a torque clutch assembly 304, a motor 306, preferably an air motor, a fluid pressure intensifier unit 308 and a fluid pressure regulator 310.

Drive from motor 306 is transmitted through torque clutch assembly 304 via bevel gearing unit 312 to a tool carrying member 314, but other means e.g. a worm drive or the like may be used. As in the embodiments illustrated in FIGS. 1 and 2, the torque clutch assembly 304 comprises two members 316 and 318 which are axially displaceable relative to each other in dependence upon the torque transmission in particular member 315 is arranged to move axially away from member 316, both clutch members 316 and 318 are provided with teeth having inclined faces 317 and 319 respectively. The motor 306 is also displaceable in an axial direction and to that end, is mounted on linear bearings 320. However, the motor may be mounted on an air bearing provided for example by air possibly exhausted from the air motor, and grooves (not shown) in the interior wall or walls of the housing 302. Strips of an antifriction material, such as polytetrafluoroethylene, located on an interior wall or walls of the housing 304, can be used to act as low friction guide rails or guide members for the motor 306 during axial movement thereof. Further grooves extant between said strips may replace the said grooves which form part of the air bearing.

The intensifier unit 308 is a pneumatic-hydraulic intensifier unit and generally includes a piston arrangement such as that illustrated in FIG. 1, and these may be used in the present example. However, it is preferred that the intensifier utilizes on the hydraulic side a bellows assembly 309 instead of the piston arrangement utilized in the intensifier unit illustrated in FIG. 1. The bellows assembly comprises a bellows unit and a cover therefore which is axially slidable. The bellows unit forms part of a wall of a hydraulic fluid reservoir, the pressure within which assuming no pressure is exerted externally on the bellows, is dictated by the air pressure introduced into the air side of the intensifier. Contraction of the bellows is monitored mechanically by for example a rod arranged similar to FIG. 2 and upon a predetermined contraction occuring, an air trip valve (not shown) is actuated to cut the power supply to the motor 206.

Figure 4:
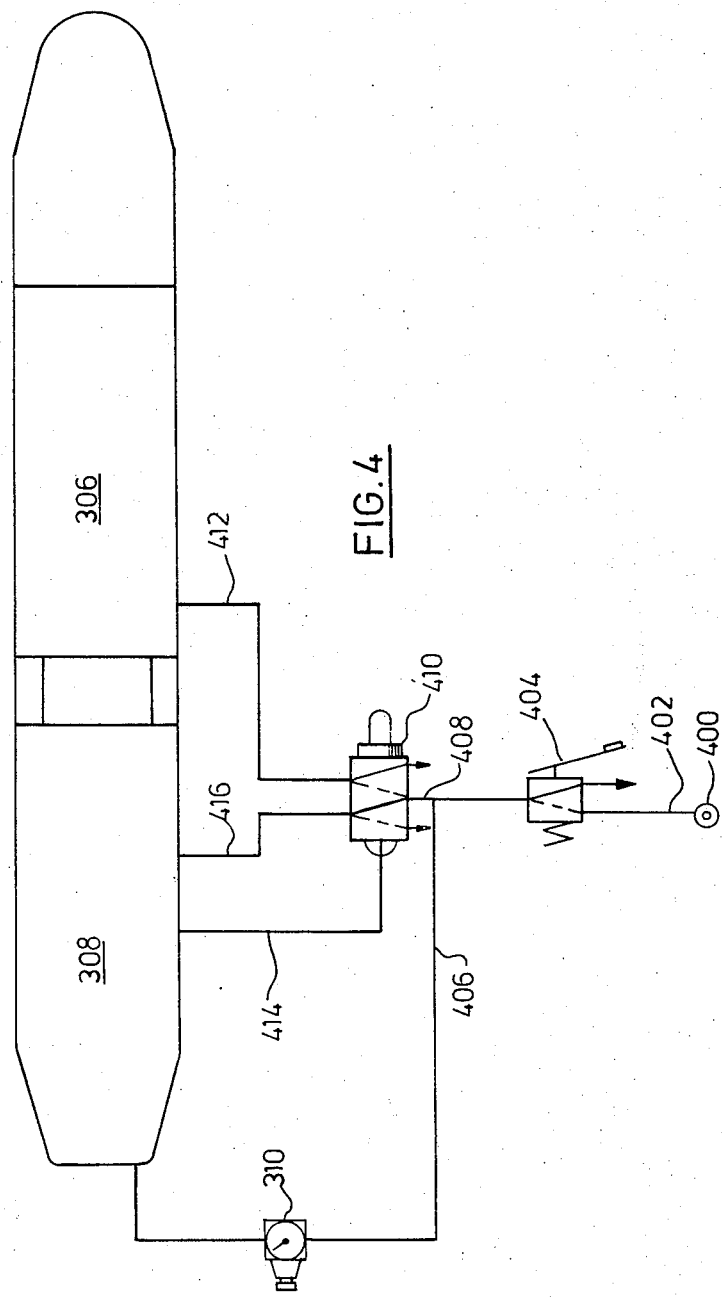
FIG. 4 is a schematic layout of an air circuit useable in conjunction with the torque limiting device of FIG. 3.

FIG. 4 shows a schematic layout of the air circuit utilized in the operation of the nut runner device illustrated in FIG. 3, and thus parts illustrated in FIG. 3 which are present in FIG. 4 are identified by the same reference numerals.

Compressed air from a source 400 serves three functions:

a. provides the pneumatic pressure in the intensifier unit 308 b. powers air motor 306 and c. acts as the actuating medium in a trip valve assembly.

Air passes from source 400 via line 402 through a "dead man's handle" arrangement 404 to a switch or start button 410 via line 408 and to the pneumatic side of intensifier 308 via line 406. An air pressure regulator 310 is included in line 406 for easy and rapid adjustment of the pressure of the air supplied to intensifier 308. As stated above the only variable which determines the maximum torque supplied by the device is the air pressure to the intensifier unit and thus the air pressure regulator 310 may be calibrated to read directly as the torque supplied (in e.g. foot-lbs) by the device.

Air supplied to the switch 410 is fed to the motor via line 412 and via line 414 to the simple trip valve assembly (not shown) within the intensifier unit, line 416 being a pressure unload line.

In operation, the air pressure regulator 310 is set at the value which will give the desired torque and push button switch 410 is actuated to supply air to motor 306. Torque is then supplied to a nut which is thereby tightened. When tightened to the desired torque, the torque clutch members 316 and 318 are separate to contract the bellows sufficiently for the trip valve to be actuated. Air may then flow in line 414 and this acts via switch 410 to cut off power to the motor 306.

Although the torque limiting device of the present invention has been described in detail with reference to its use as a motor driven torque limiting nut runner it is also suitable for adaptation to other uses, including filament drawing machinery, to control tension, and for the tensioning of springs, and for the tightening of other fasteners e.g. screws or in any application where it is necessary to apply a desired torque to a member.

I claim:

1. A torque limiting driving device comprising a motor, an output shaft, a clutch assembly interconnecting said motor and said output shaft for effecting driving of said output shaft, said clutch assembly including two cooperating axially displaceable clutch members, a fluidic control device operative on said clutch assembly to maintain said interconnection between said motor and said clutch assembly, and a controller for said motor connected to said fluidic control device for actuation thereby in response to a predetermined force exerted by said clutch assembly on said fluidic control device to render said motor inoperative; said fluidic control device including a closed fluidic system having fluid displacing means operable in response to separation of said clutch members, and pressure means for fluidically applying a predetermined force on said clutch assembly resisting separation of said clutch members.

2. The driving device of claim 1 wherein said means for fluidically applying a predetermined force is connected to said closed fluidic system and said predetermined force is applied therethrough.

3. The driving device of claim 2 wherein said closed fluidic system includes a pressure member movable in response to movement of said fluid displacing means, and said pressure means includes means for applying a fluid pressure on said pressure member to pressurize said closed fluidic system and maintain a predetermined pressure contact between said clutch members.

4. The driving device of claim 3 wherein said pressure member includes first, second and third piston portions, said first piston portion being part of said closed fluidic system, said second piston portion being part of said pressure means, and said third piston portion being part of said controller.

5. The driving device of claim 3 wherein said pressure means includes means for selectively varying said fluid pressure applied to said pressure member.

6. The driving device of claim 2 wherein said controller is actuated by movement of said fluid displacing means.

7. The driving device of claim 1 together with a housing having mounted therein said clutch assembly with one of said clutch members being fixed against axial movement and axial movement of the other of said clutch members away from said one clutch member being resisted by said fluidic control device, and said fluid displacing means being a piston with said housing defining a cylinder for said piston and forming part of said closed fluidic system.

8. The driving device of claim 1 together with a housing having mounted therein said clutch assembly with one of said clutch members being fixed against axial movement and axial movement of the other of said clutch members away from said one clutch member being resisted by said fluidic control device, and said fluid displacing means being bellow means.

9. The driving device of claim 1 together with a housing having mounted therein said clutch assembly with one of said clutch members being fixed against axial movement and axial movement of the other of said clutch members away from said one clutch member being resisted by said fluidic control device, said motor being mounted within said housing for axial displacement and being positioned between said other clutch member and said fluidic control device.

10. A torque limiting device comprising a motor a motor shaft driven by said motor, an output shaft, a clutch assembly providing a power transmission connection between said motor shaft and said output shaft, said clutch assembly including a pair of clutch members which are separable responsive to angular displacement between said shafts, means including a movable wall defining a fluid chamber adjacent one of said clutch members with said movable wall arranged to transmit thrust between said fluid chamber and said one clutch member, fluid pressure means including a fluid connection to said fluid chamber for pressurizing fluid in said chamber, the fluid pressure acting through said movable wall to exert thrust on said one clutch member for both maintaining said clutch members engaged with one another and simultaneously determining the upper limit of torque capable of being sustained by said clutch assembly, and motor control means operable as a function of the fluid pressure in said chamber to stop the motor whevever the output shaft encounters a torque requirement which exceeds said upper torque limit and results in relative angular displacement of said shafts with consequential separating movement of said clutch members.

11. The torque limiting device of claim 10 together with a housing having mounted therein said clutch assembly with one of said clutch members being axially movable under load with movement thereof being resisted by said movable wall, and said movable wall being part of bellows means.

* * * * *